United States Patent
Hardy et al.

[15] 3,704,546
[45] Dec. 5, 1972

[54] SYMBIOTIC FIXATION OF ATMOSPHERIC NITROGEN

[72] Inventors: Ralph W. F. Hardy, Unionville, Pa.; Richard D. Holsten, Wilmington, Del.

[73] Assignee: E. I. du Pont de Nemours & Company, Wilmington, Del.

[22] Filed: June 4, 1971

[21] Appl. No.: 150,179

Related U.S. Application Data

[63] Continuation-in-part of Ser. No. 805,382, March 7, 1969, abandoned.

[52] U.S. Cl. ....................................................47/58
[51] Int. Cl. ..............................................A01h 17/00
[58] Field of Search ...195/50; 47/58, 1.2; 71/1, 6–10

[56] References Cited

UNITED STATES PATENTS

| | | | |
|---|---|---|---|
| 2,747,334 | 5/1956 | Routien et al. | 47/58 |
| 3,514,900 | 6/1970 | McDade | 47/58 |
| 3,628,287 | 12/1971 | Staba et al. | 47/58 |

OTHER PUBLICATIONS

Lewis et al., Botanical Gazette 95: pages 316–329 relied on.

*Primary Examiner*—Robert E. Bagwill
*Attorney*—Anthony P. Mentis

[57] ABSTRACT inoculated cells from plants are caused to grow aseptically in a synthetic liquid culture medium to produce a mass of undifferentiated plant cells. These are aseptically inoculated with a symbiotic microorganism to produce a synthetic symbiotic system that is capable of fixing atmospheric nitrogen. The end product contains available protein material.

3 Claims, No Drawings

SYMBIOTIC FIXATION OF ATMOSPHERIC NITROGEN

CROSS REFERENCE TO RELATED APPLICATION

This application is a continuation-in-part of our copending application Ser. No. 805,382, filed Mar. 7, 1969, and now abandoned.

The fixation of atmospheric nitrogen is highly important both as a natural and a commercial process. Symbiotic nitrogen fixation as it occurs in nature is a primary factor in agriculture and food production and any method which can augment this natural process is potentially valuable. Considerable effort has been expended in the search for synthetic methods of fixing nitrogen but no completely satisfactory process has yet been found. A system whereby relatively large quantities of undifferentiated plant cells can be grown in a restricted space and used to convert atmospheric nitrogen into utilizable reduced nitrogen compounds such as proteins is an important goal.

It is an object of this invention to obtain fixation of nitrogen by a synthetic process involving the aseptic production and growth of undifferentiated plant cells together with symbiotic microorganisms.

It is a further object of this invention to obtain symbiotic nitrogen-fixation which involves incubating undifferentiated plant cells under aseptic conditions with symbiotic microorganisms in a liquid culture medium so that the microorganisms penetrate and occupy the plant cells.

It is a still further object of this invention to obtain development of the undifferentiated plant cells with their contained symbiotic microorganisms in a medium which contains few if any exogenous growth factors.

These and other objects of the invention are accomplished by providing a liquid nutrient medium containing live undifferentiated plant cells, aseptically inoculating the plant cells in the liquid culture medium with live symbiotic microorganisms, maintaining the liquid culture medium in aseptic condition to allow the microorganisms to enter into and occupy the plant cells, and for the undifferentiated plant cells with their contained micro-organisms to fix gaseous nitrogen from the atmosphere.

A mass of undifferentiated plant cells may be obtained by aseptically removing a small piece of plant tissue from a selected organ, as from the root, stem, etc. and placing it in a sterile medium containing appropriate nutrients. Such a tissue explant will grow and proliferate into a large number of the same type of plant cells or of related plant cells, without specialization of these cells to form specific plant organs such as roots or leaves, etc. These cells may be referred to as a heterogeneous population or colony of undifferentiated plant cells comprised of single cells as well as aggregates of cells. This type of uninterrupted cell growth and multiplication without the formation of specific plant organs is known as undifferentiated cell growth.

Many symbiotic combinations capable of fixing atmospheric nitrogen are known to exist in nature, including the Leguminosae family of plants and their symbiotic soil bacteria. Some examples are:

| PLANT | SYMBIONT |
|---|---|
| Glycine max | Rhizobium japonicum |
| Phaseolus vulgaris | Rhizobium phaseoli |
| Medicago sativa | Rhizobium meliloti |
| Arachis hypogea | Rhizobium sp. |
| Pisum sativum | Rhizobium leguminosarum |
| Trifolium pratensi | Rhizobium trifolii |

Nutrient materials which favor the growth of plant cells are well known. They encompass the so-called plant growth factors, inorganic salts, including salts of trace elements, carbohydrates, and vitamins. All of these may be of natural or synthetic origin. The plant growth factors include cytokinins such as deproteinized coconut milk, benzyladenine and the like; and auxins, such as 2,4-dichlorophenoxyacetic acid, indoleacetic acid, indolebutyric acid, naphthaleneacetic acid and so forth. The inorganic salts, which are herein referred to as "basal salts," include phosphates, nitrates, chlorides and sulfates, etc. of metals such as sodium, potassium, calcium, magnesium and of metals which are needed in trace amounts only. Carbohydrates include glucose, sucrose, starch, corn syrup and the like while vitamins may be illustrated by thiamine, riboflavin, pantothenic acid, niacin and so forth. Carbohydrates and the mineral salts are usually considered to be nutrients for bacteria. The amounts of these nutrient materials which may be used are well known and may be varied quite widely so long as sufficient quantities are used to favor the growth of the organisms involved.

The medium in which the inoculation of the undifferentiated plant cells with the microorganisms takes place must be liquid, e.g., water, in which the nutrient materials are contained. This is a most important element since it appears to be necessary for the bacteria to invade the plant cells. In the absence of a liquid medium the bacteria do not enter into the plant cells and no symbiotic relation is established.

In general the present invention contemplates a completely aseptic procedure in which the first step is the aseptic growth of undifferentiated plant cells derived from members of the Leguminosae in a suitable medium. With the undifferentiated plant cells contained in a liquid medium having the necessary nutrient materials present, bacteria of the genus Rhizobium are aseptically added. The plant cells and bacteria in the liquid culture medium are then incubated together for a suitable time and at a suitable temperature, usually about 20° to about 30°C., to allow microorganisms to enter and occupy the plant cells. Further growth and development of the plant cells with their contained microorganisms is accomplished in a medium having substantially no growth stimulating activity on the plant cells. The greatest nitrogen-fixing activity occurs in this latter stage.

The final products containing plant cells and symbiotic bacteria are valuable sources of useable reduced nitrogen formed from the normally unuseable nitrogen of the atmosphere. These final products are valuable as foods or food supplements containing proteins or amino acids for livestock such as swine and poultry or other animals which must be supplied with reduced nitrogen and/or amino acids. The products can also serve as a source from which valuable nitrogen compounds such as proteins and essential amino acids can be extracted according to known methods. The reduced nitrogen products can further be used as nitrogen fertilizers either alone or admixed with other known fertilizer compositions.

It is interesting to point out that invasion of the undifferentiated plant cells by the microbes occurs to such an extent that eventually the microbes essentially fill the entire plant cell. Electron microscope photographs show the plant cell cytoplasm is almost entirely replaced by the microorganism population. Invasion of undifferentiated plant cells by microorganisms under the synthetic conditions of this invention has never been reported previously and appears to be a new phenomenon.

A culture of the appropriate plant tissue can be established by aseptically removing a small piece of the organ of selected cell origin and placing this tissue explant upon the surface of an agar-solidified basal medium containing plant growth factors. The natural growth factors, e.g., deproteinized coconut milk, can be supplied in the concentration range of 2 to 20 percent by volume; cytokinins in the molar concentration range of $10^{-4}$ to $10^{-10}$; auxins in the molar concentration range of $10^{-3}$ to $10^{-7}$, with various combinations of these factors being utilized to initiate rapid cell divisions in the selected plant tissue. Following establishment of a mass of rapidly growing, undifferentiated cells, which may be referred to as a callus, on the agar medium, the cells are transferred to a liquid system employing a growth medium similar in composition to that utilized to initiate the primary culture. Continued rapid cell divisions in this liquid system give rise to a large undifferentiated plant cell population which is then inoculated with the appropriate symbionic microorganisms.

The plant cells and microorganisms are kept in intimate association in the liquid system in the dark for a period of about 2 to 10 days which is usually sufficient to allow initial penetration of the plant cells by the bacteria.

After bacterial penetration and invasion of the plant cells has been accomplished, the cells are washed with sterile basal salts solution or sterile water, etc. to remove any extra-cellular microorganisms or metabolic products which might interfere with the continued development of the symbiotic relationship. The washed cells are then transferred to fresh sterile growth media composed of: (a) basal salts, (b) basal salts and cytokinins, or (c) basal salts, cytokinins, and auxins. These media may be either liquid or solid (e.g., with agar). The cultures are generally maintained for several days in a temperature range of 20°–30°C. for further development of the symbiosis.

The symbiotic system thus established fixes atmospheric nitrogen as determined by using the reduction of acetylene to ethylene assay, by extraction of cellular proteins and by fixation of $^{15}N$ isotope, applied to selected undifferentiated cell samples. The nitrogen-fixing activity of the cultures is related to the plant growth factors in the culture media as well as to the degree of microorganism invasion of the plant cells. Reduction of exogenous cytokinins and auxins stimulates both microorganism penetration of the cells and nitrogen-fixing activity.

The following examples illustrate how the invention may be practiced.

EXAMPLE I

Cultures of soybean root tissue (*Glycine max* var. Acme) were initiated by germinating surface-sterilized seed under aseptic conditions on an agar-solidified basal medium containing the following:

BASAL MEDIUM

| Ingredients | mg./liter |
|---|---|
| $NH_4NO_3$ | 1650.0 |
| $KNO_3$ | 1900.0 |
| $KH_2PO_4$ | 170.0 |
| $Na_2EDTA$ (sodium ethylene diamine tetraacetic acid) | 37.3 |
| $FeSO_4 \cdot 7H_2O$ | 27.8 |
| $H_3BO_3$ | 6.2 |
| $MnSO_4 \cdot 4H_2O$ | 22.3 |
| $ZnSO_4 \cdot 4H_2O$ | 8.6 |
| $KI$ | 0.83 |
| $Na_2MoO_4 \cdot 2H_2O$ | 0.25 |
| $CuSO_4 \cdot 5H_2O$ | 0.025 |
| $CoCl_2 \cdot 6H_2O$ | 0.025 |
| $CaCl_2 \cdot 2H_2O$ | 440.0 |
| $MgSO_4 \cdot 7H_2O$ | 370.0 |
| Thiamine HCl | 0.4 |
| Inositol | 100.0 |
| Sucrose | 30,000.0 |

After the seeds had germinated in about 1 week and when each primary root had reached a length of approximately 2 inches, it was excised using aseptic techniques and a small (approximately 5 mm) segment or explant was removed from the middle of each root and placed on the surface of an agar-solidifed basal medium in a closed container. This medium was as described above except that it was supplemented with 15 percent deproteinized coconut milk (CM) and 2 mg. per liter of 2,4-dichloro-phenoxyacetic acid (2,4-D). The root explants were incubated at about 25°C. in the dark to initiate cell proliferation and to produce a mass of growing undifferentiated plant cells or callus. The callus mass, composed of undifferentiated, actively dividing cells, was then aseptically subcultured to fresh liquid media of similar composition to maintain growth of the cells. The liquid cultures were aerated by continuous shaking, tumbling, or other appropriate means as by bubbling a stream of sterile air through the liquid. Following the establishment of an actively growing undifferentiated cell culture, liquid transfers were made to fresh media of varying compositions at selected intervals.

A mass of undifferentiated cells derived from soybean root growing in 225 ml. of liquid medium in the dark, which contained the components shown in the preceding table together with 15 percent deproteinized coconut milk and 2 ppm (parts per million) 2,4-dichlorophenoxyacetic acid, was inoculated with 0.5 ml of a liquid culture of soil bacteria identified as *Rhizobium japonicum* (ATCC 10324 or Strain No. 61A76; The Nitragin Co.). The bacterial culture medium had the following composition (in grams/liter):

| | |
|---|---|
| $K_2HOP_4$ | 1.0 |
| $KH_2PO_4$ | 1.0 |
| $FeCl_3 \cdot 6H_2O$ | 0.005 |
| $MgSO_4 \cdot 7H_2O$ | 0.36 |
| $CaSO_4 \cdot 2H_2O$ | 0.17 |
| $KNO_3$ | 0.70 |
| yeast extract | 1.0 |
| mannitol | 3.0 |

The bacteria were maintained in the flask with the plant cells for a period of 5 days to permit invasion of the plant cells by the bacteria. After 5 days, the mass of undifferentiated plant cells and contained bacteria was removed from the culture flask, aseptically washed with a basal salts medium and transferred to fresh liquid and agar-solidified media of the following compositions:

1. Basal medium
2. Basal medium + 10% coconut milk

3. Basal medium + 10% coconut milk + 2 ppm 2,4-D

The agar-solidified cultures, one from each treatment, were grown in the light, about 1,000 foot candles from fluorescent tubes, as well as in the dark. The liquid cultures, 50 ml. contained in 250 ml. Erlenmeyer flasks, were incubated for 16 days at room temperature under laboratory light conditions with constant shaking to facilitate aeration. The light grown cultures on semi-solid agar media were also maintained at room temperature.

After 12 days of incubation on the semi-solid agar medium in the light, the cultures were assayed for acetylene to ethylene conversion activity as proof of their nitrogen-fixing ability. The assay was performed by placing the plant cells from the culture into a 5 ml. glass syringe. The syringe was stoppered with a rubber stopall, flushed with an argon:oxygen (0.8:0.2 by volume) atmosphere and finally gassed with 5 ml. of an $Ar:O_2:C_2b42$ atmosphere of composition 0.7:0.2:0.1 by volume. The syringes were incubated for three hours at room temperature with constant mixing by tumbling before being analyzed for ethylene gas chromatographically on an ester-amide column at 0°C. (See Hardy et al., Plant Physiology Vol. 43, No. 8, August 1968, pp. 1,185–1,207.) The following results were obtained:

| Culture Treatment | Millimicromoles of ethylene produced per sample in 24 hours. | Undifferentiated Plant Cells fresh wt. (mg.) |
| --- | --- | --- |
| Basal medium | 5.6 | 76.9 |
| Basal medium + 10% coconut milk | 4.3 | 117.6 |
| Basal medium + 10% coconut milk + 2 ppm 2,4-D | 0.7 | 90.7 |

The ethylene production was highest in the basal medium alone and fell off with increasing growth factor additions. The most active mass of plant cells was the least in fresh weight.

Samples of plant cells from the preceding were fixed in a formalin:acetic acid:ethyl alcohol solution (5:5:90 by volume), dehydrated through the ethanol series and finally embedded in paraffin for sectioning and study of tissue morphology. The analysis of these plant cell masses shows there is greatest bacterial invasion of the plant cells in the basal medium along. Lesser bacterial invasion occurs where the basal medium is supplemented with growth factors and both of these findings correlate with the acetylene to ethylene activity.

EXAMPLE II

Inoculated plant cells maintained in the dark for 12 days on semi-solid agar media as described in Example 1 were assayed for acetylene to ethylene activity in the same manner except that incubation was for 45 minutes at room temperature instead of for 3 hours. The following results were obtained:

| Culture Treatment | Millimicromoles of ethylene produced per sample in 24 hours. | Undifferentiated Plant Cells fresh wt. (mg.) |
| --- | --- | --- |
| Basal medium | 14.4 | 45.2 |
| Basal medium + 10% coconut milk | 5.6 | 43.4 |
| Basal medium + 10% coconut milk + 2 ppm 2,4-D | 3.6 | 95.1 |

The highest acetylene to ethylene activity was found in the unsupplemented cultures and decreasing activity in the cultures having added growth factors. Paraffin sections showed greater bacterial invasion in those cells kept in the unsupplemented basal medium, with lesser amounts of bacterial invasion in those cells kept in the basal medium to which growth factors had been added.

EXAMPLE III

The inoculated plant cells of Example I which were transferred to liquid media and allowed to incubate at room temperature with constant shaking for 16 days, were also analyzed for acetylene to ethylene activity. The following results were obtained with substantially equivalent weights of tissue:

| Culture Treatment | Millimicromoles of ethylene produced per sample in 24 hours. |
| --- | --- |
| Basal medium | 3.8 |
| Basal medium + 10% coconut milk | 1.2 |
| Basal medium + 10% coconut milk + 2 ppm 2,4-D | 0.4 |

The acetylene to ethylene activity was in direct proportion to the reduction in growth factor additions and was lower overall.

EXAMPLE IV

Undifferentiated plant cells which are not inoculated with bacteria show negligible acetylene to ethylene activity in this assay system. In an experiment, undifferentiated plant cells of soybean root origin, both bacterially infected and non-infected, growing in a liquid basal medium with cytokinin and auxin supplements were analyzed for acetylene to ethylene activity in the standard assay proceduce using 50 ml. syringes. The following results were obtained at 24 hours of incubation at room temperature:

| Culture Treatment | Millimicromoles of ethylene produced per g. dry weight sample in 24 hours |
| --- | --- |
| Undifferentiated plant cells + *Rhiz. japonicum* | 87.5 |
| Undifferentiated plant cells (no bacteria) | 16.5 |

EXAMPLE V

The total protein content of soybean root tissue grown in liquid culture as described in Example I either inoculated with symbiotic bacteria or uninoculated was determined using the Biuret procedure. The culture inoculated with *Rhizobium japonicum* strain 61A76 was maintained on a medium containing only minimal quantities of inorganic nitrogen compounds as shown in the tabulation below while the uninoculated control culture received the full nitrogen basal medium described in Example I, supplemented with 15 percent whole coconut milk and 2 mg./liter of 2,4–D.

The tissue samples for protein determination were ground in a mortar and pestle using 10 ml. of distilled water per sample. The homogenate was filtered to remove cellular debris and 2 ml. of the filtrate was treated with 0.5 ml. of 50 percent trichloroacetic acid to precipitate the proteins. The proteinaceous precipitate was collected as a pellet by centrifuging for 1 hour at 3,000 rpm in a clinical centrifuge. The clear supernatant above the pellet was removed by pipette and discarded.

The resultant pellets were treated with 2 ml. of biuret reagent and 2 ml. of distilled water. The tubes were incubated at 37°C. in a water bath for 30 minutes before determining the optical density at 540 m$\mu$ against a reagent blank. The total protein content was determined by comparing the optical density (O.D.$_{540}$) with a standard curve. The following results were obtained for total protein in each sample:

|  | Fresh wt. (g) | Protein in sample mg. | % |
|---|---|---|---|
| Inoculated tissue | 2.09 | 15.05 | 0.72 |
| Uninoculated tissue | 2.81 | 5.90 | 0.20 |

The assay shows that utilizable amounts of protein are extractable from tissue cultures grown in liquid culture, and that inoculation of the tissues with a symbiotic bacterium leads to markedly increased levels of protein over those in the uninoculated tissue even though the latter system was supplied with higher levels of reduced nitrogen in the culture medium.

Low Nitrogen Medium (pH 5.8)

| Ingredients | mg./liter |
|---|---|
| KH$_2$PO$_4$ | 500 |
| Na$_2$EDTA | 40 |
| FeSO$_4$·7H$_2$O | 50 |
| CaCl$_2$ | 500 |
| MgSO$_4$·7H$_2$O | 370 |
| NH$_4$NO$_3$ | 200 |
| Sucrose | 30,000 |
| H$_3$BO$_3$ | 6.2 |
| MnSO$_4$·H$_2$O | 22.3 |
| ZnSO$_4$·7H$_2$O | 8.6 |
| KI | 0.8 |
| Na$_2$MoO$_4$·2H$_2$O | 0.3 |
| CuSO$_4$·5H$_2$O | 0.03 |
| CoCl$_2$·6H$_2$O | 0.03 |
| Thiamine·HCl | 0.4 |
| Inositol | 100.0 |

EXAMPLE VI

Undifferentiated cells from soybean root tissue (Acme variety) as described in Example I were grown in air in a low nitrogen liquid medium (see Example V) supplemented with 10$^{-7}$ $\mu$ benzyladenine and 2 mg./liter indoleacetic acid. The cultures were maintained in the dark for about 2 weeks to obtain substantial growth. The cultures were then inoculated with Rhizobium japonicum strain 61A76 for establishment of the symbiotic relationship, with a control culture maintained on a similar medium but not inoculated with bacteria.

After 7 days of incubation following the day of bacterial inoculation, cellular invasion by the Rhizobia was apparent. At this time the air atmosphere of the 80 ml. flasks was replaced with 0.15 atm oxygen, 0.60 atm argon and 0.25 atm $^{15}$N-enriched nitrogen gas (99.9 atom % $^{15}$N). Incubation was continued for 10 days after sealing the flasks. All flasks were treated in the manner described.

On the 10th day the tissue was removed, weighed and subjected to Kjeldahl digestion with the resulting ammonia isolated as (NH$_4$)$_2$SO$_4$ by distillation by standard procedures. Using the procedures described by Burris and Wilson (Methods in Enzymology, Vol. IV, 1957) the isolated (NH$_4$)$_2$SO$_4$ was subjected to treatment with alkaline bromine and the N$_2$ generated by this treatment collected and analyzed for masses 28, 29 and 30 by mass spectrometric analysis. From these data the extent of $^{15}$N incorporation was calculated from atom % $^{15}$N enrichment values. The results obtained (0.016 atom % $^{15}$N) for the symbiotic cultures as shown below exceed the minimum value considered by Burris and Wilson as confirming fixation of this isotope.

| Treatment | Atom % $^{15}$N | Atom % Excess |
|---|---|---|
| Air Standard | 0.352 | — |
| Uninoculated Control | 0.348 | −0.004 |
| Inoculated | 0.368 | 0.016 |

The above test is based on the fact that in nature nitrogen comprises 99.636% $^{14}$N isotope and 0.364% $^{15}$N isotope and this ratio will be found in all nitrogen containing materials, including air, unless the material has been enriched with one or the other isotope. A sample of air is analyzed to provide the numerical "air standard" value from which possible enrichments can be determined by difference and also to insure that the spectrometer is functioning properly.

In the procedures illustrated the cellular growth media, and particularly the basal media, are of a standard and well recognized type that supply nutrients necessary for cells. One such medium used for cultivation of plant tissue is shown in U.S. Pat. No. 2,747,334. The concentration of the various components can vary within relatively wide limits.

The temperatures employed are those for isolated cellular growth, usually from 20° to 30°C. and preferably about 23°–27°C.

The process of this invention can be carried out either in the presence or absence of light and it is generally preferred to conduct the growth of the undifferentiated plant cells in the presence of air.

Although undifferentiated plant cells derived from soybean root tissue and Rhizobium japonicum are shown in the examples, other plant and bacterial species which are capable of producing a symbiotic nitrogen-fixing system are applicable, as previously stated. As one example, when peanut cotyledon tissue is used with Strain No. 47A1 (The Nitragin Co.) Rhizobium, grown in substantially the same media as the Rhizobium of Example 1, assays show that nitrogen-fixing activity is established.

The media employed should be produced and maintained under substantially aseptic conditions, i.e., substantially free from other living organisms except those being cultured.

Coconut milk is a natural product which contains both inorganic and organic material. Concentrations in the range of 2 to 20 percent by volume based on volume of growth media are effective in promoting rapid cell division with some dependence on the particular plant species studied. The coconut milk is a source of cytokinins and auxins which are required for normal plant cell growth. In tissue culture methodology, the molar concentration ranges utilized for the cytokinins vary from approximately $10^{-4}$ to $10^{-10}$, and for the auxins, $10^{-3}$ to $10^{-7}$. The examples show 2,4-dichlorophenoxyacetic acid as an auxin at 2 mg./liter for optimum growth.

It has been reported that the ratio of moles of ethylene formed in the acetylene assay to moles of nitrogen fixed is between 3 and 4. Using this range, the following calculations of the millimicromoles of nitrogen fixed per sample for each example were made.

TABLE example I

| Culture Treatment | Millimicromoles of nitrogen fixed per sample in 24 hrs. |
|---|---|
| Basal medium | 1.40 to 1.86 |
| Basal medium + 10% coconut milk | 1.07 to 1.43 |
| Basal medium + 10% coconut milk + 2 ppm 2,4-D | 0.17 to 0.23 |

Example II

| Basal medium | 3.60 to 4.80 |
|---|---|
| Basal medium + 10% coconut milk | 1.40 to 1.87 |
| Basal medium + 10% coconut milk + 2 ppm 2,4-D | 0.90 to 1.20 |

Example III

| Culture Treatment | Millimicromoles of nitrogen fixed per sample in 24 hrs. |
|---|---|
| Basal medium | 0.97 to 1.27 |
| Basal medium + 10% coconut milk | 0.30 to 0.40 |
| Basal medium + 10% coconut milk + 2 ppm 2,4-D | 0.10 to 0.13 |

Example IV

| Culture Treatment | Millimicromoles of nitrogen fixed per g. dry weight in 24 hrs. |
|---|---|
| Undifferentiated plant cells + *Rhiz. japonicum* | 21.9 to 29.2 |
| Undifferentiated plant cells (no bacteria) | 4.1 to 5.5 |

Bacterial penetration into the plant cells takes place in from 2 to 10 days in the liquid environment, with 3 to 5 days generally being satisfactory. One to two weeks of additional time are usually sufficient to produce the greatest nitrogen-fixing activity. The actual number of bacterial cells added can vary widely. In the preceding example, about $300 \times 10^6$ cells were added per 225 ml. of culture medium. This number does not appear to be critical and the only requirement seems to be for an actively growing bacterial culture specific for the strain of plant cells used.

It has been previously shown that nitrogen-fixing activity is directly related to acetylene reducing activity of symbionts. The quantitative relationship between nitrogen-fixing and acetylene-reducing activity is indicated by the equations:

(1) 

(2) 

Ethylene produced by this reduction is readily determined by gas chromatographic analysis.

Since obvious modifications and equivalents in the invention will be evident to those skilled in the involved arts, we propose to be bound solely by the appended claims.

The embodiments of the invention in which an exclusive property or privilege is claimed are defined as follows:

1. A process for synthetic, aseptic, symbiotic fixation of gaseous nitrogen consisting essentially in the steps of
   a. providing a liquid nutrient culture medium consisting essentially of live undifferentiated plant cells from the family Leguminosae;
   b. aseptically inoculating the undifferentiated plant cells in the liquid culture medium with live symbiotic microorganisms from the genus Rhizobium;
   c. maintaining the liquid culture medium in aseptic condition in the presence of gaseous nitrogen to allow the microorganisms to enter and occupy the undifferentiated plant cells;
   d. aseptically washing the plant cells to remove extracellular microorganisms and metabolic products; and
   e. maintaining the washed plant cells and their contained microorganisms in a sterile liquid nutrient medium, which has substantially no growth stimulating activity on the said plant cells, to allow the plant cells with their contained symbiotic microorganisms to fix gaseous nitrogen.

2. A process according to claim 1 in which the liquid culture medium of step (a) contains added plant growth factors.

3. A process for fixing gaseous nitrogen consisting essentially in the steps of
   providing an aqueous culture medium consisting essentially of undifferentiated plant cells derived from the family Leguminosae,
   said culture medium containing a plurality of nutrient materials selected from the group consisting of plant growth factors, mineral salts, carbohydrates and vitamins, in quantities sufficient to favor growth of the plant cells,
   aseptically inoculating the undifferentiated plant cells in the aqueous culture medium with live soil bacteria of the genus Rhizobium,
   maintaining the inoculated culture medium in aseptic condition for about 2 to 10 days at a temperature of about 20°C. to 30°C. to allow the bacteria to enter into the plant cells,
   aseptically transferring the undifferentiated plant cells and their contained bacteria to a sterile nutrient culture medium substantially free of exogenous plant growth factors, and
   aseptically maintaining the culture medium for a further period of about one to two weeks in the presence of gaseous nitrogen to allow the system to fix gaseous nitrogen.

* * * * *